United States Patent [19]

Kuboyama

[11] Patent Number: 4,645,555
[45] Date of Patent: Feb. 24, 1987

[54] HOT STAMPING METHOD
[75] Inventor: Kiyoshi Kuboyama, Tokyo, Japan
[73] Assignee: Asahi Screen Process Insatsu Kabushiki Kaisha, Tokyo, Japan
[21] Appl. No.: 712,522
[22] Filed: Mar. 18, 1985
[30] Foreign Application Priority Data Jan. 25, 1985 [JP] Japan .................................. 60-11090

[51] Int. Cl.⁴ .......................... B32B 31/00; B44C 1/16
[52] U.S. Cl. .................................... 156/234; 156/230; 156/241; 156/249; 156/344
[58] Field of Search .............. 156/230, 234, 248, 249, 156/247, 289, 229, 267, 344, 241; 101/32, 33, 34; 428/43, 202

[56] References Cited

U.S. PATENT DOCUMENTS 3,554,835 1/1971 Morgan ................................ 156/234
3,658,616 4/1972 Dreyer ................................ 156/234
3,936,570 2/1976 Iwata ................................... 156/234
4,484,970 11/1984 Burzlaff et al. ..................... 156/233

FOREIGN PATENT DOCUMENTS 56-55282 5/1981 Japan .................................. 156/233
59-78381 5/1984 Japan .................................. 156/230

Primary Examiner—Michael Wityshyn
Assistant Examiner—Louis Falasco
Attorney, Agent, or Firm—Kramer and Brufsky

[57] ABSTRACT

A hot stamping method enables the formation of very sharp edges and profiles of characters/numerals, patterns and the like upon a surface of a base plate. This method comprises a masking step making certain characters, numerals and patterns formed by a masking layer upon a surface of a base plate; a step of placing a foil sheet having an adhesive layer upon a surface of the masking layer and a surface of the base plate, and transferring a foil of the foil sheet to the surface of the base plate by means of heat and pressure; and a step of leaving the transferred foil upon the surface of the base plate and releasing the masking layer and the foil transferred to the surface thereof from the base plate.

2 Claims, 14 Drawing Figures

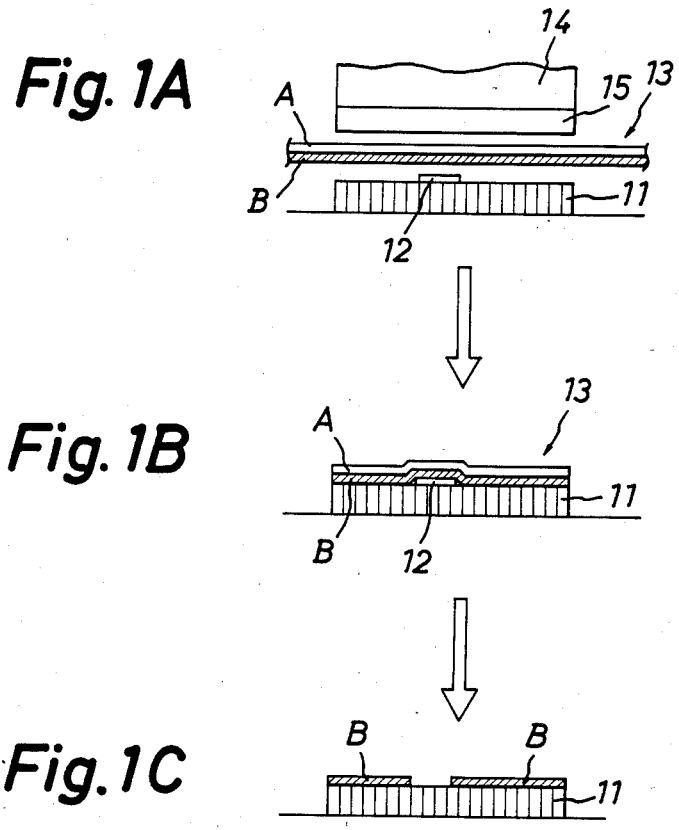
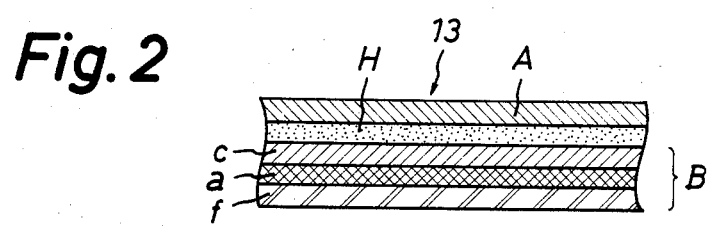

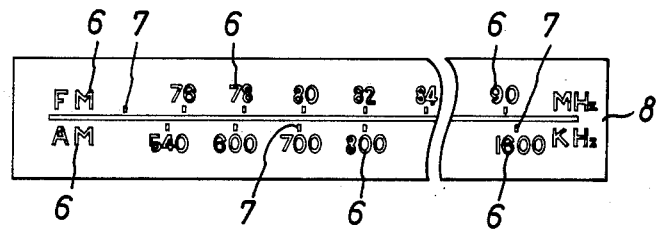
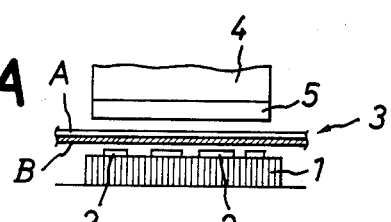
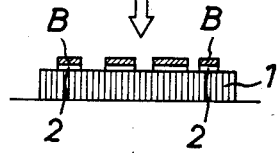
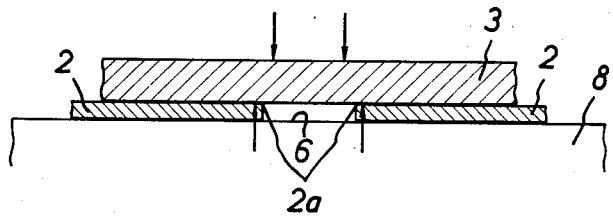
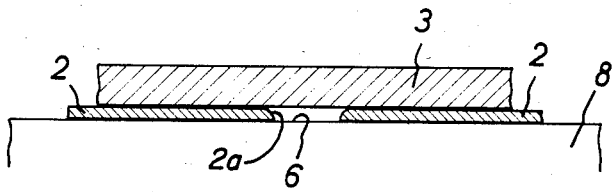

HOT STAMPING METHOD

BACKGROUND OF THE INVENTION

1. Field of the Invention

This invention relates to a hot stamping method. Indication panels manufactured by this hot stamping method are applied in various measuring instruments for cars, aircraft and other vehicles.

2. Description of the Prior Art

In Japanese Examined Patent Publication No. 56-9708 (published in 1981) the present applicant proposed a hot stamping method.

According to the conventional hot stamping method, some characters, patterns and the like are, as shown in FIG. 6A, printed by an adhesive 2 of acrylic resin or the like upon a substrate 1 such as paper, leather, metal plastic material, etc., and a foil sheet 3 is placed on the printed surface. Such foil sheet 3 is heated by a silicone rubber 5 attached to the bottom of a heating plate 4 and then pressed on the substrate 1. That is, as shown in FIG. 6B, a foil B is transferred to a portion of the adhesive 2.

According to an example of the foil sheet 3, the foil B is adhered to a base film A by way of a release agent H. The purpose of release agent H is to release the base film A easily from the foil B. As shown in FIG. 6C, the foil B comprises a foil body a, a coating layer b and a lacquer layer c disposed facing the inner surface of the base film A to protect the foil body a. The coating layer b may have adhesion to e.g. a metal plate, a plastic plate, a glass plate and the like respectively. However, there is the case that it has no adhesion to some kinds of plates.

According to this conventional technique, the coating layer 6 is not adhesive to the base plate. More specifically, it has no adhesion thereto under an application of heating and pressure.

Accordingly, the foil sheet 3 heated and pressed by the silicone rubber 5 is adhered to the adhesive 2 on the substrate 1, but it is not adhered to any non-adhesive portion of the substrate 1, because the coating layer b is non-adhesive. Therefore, when releasing the base film A from the foil B, the foil B remains on the adhesive 2 portion, namely the former is transferred to the latter.

According to this conventional hot stamping method, the characters, numerals, patterns, etc. are printed by the adhesive 2, to which the foil B is transferred. Accordingly, an expensive relief printing is not necessary.

However, when leaving the characters, numerals and patterns as they expose natural surfaces of the substrate 1 and transferring the foil to the other part of the substrate 1, the printing (or transferred) area of the adhesive becomes thicker and its consumption is increased. Consequently, such a conventional hot stamping method becomes disadvantageous.

Accordingly, this conventional hot stamping is not applicable for an example in FIG. 5, in which the characters/numerals 6 and the graduations 7 having a small and narrow area remain on the surface of a plastic plate 8 while exposing natural surfaces thereof and the foil sheet 3 is transferred to a wider portion of the plastic plate 8.

Under such circumstances, when applying the printed adhesive 2 to the foil sheet 3 under the application of heating and pressure, the disadvantage is that the adhesive 2 may enter a recessed portion 6 (or recessed characters or the like) as shown in FIG. 8.

Still further, when pressing the foil sheet 3 on the adhesive 2 by means of the silicone rubber 5 or the like, the shoulder 2a of the adhesive 2 is deformed as shown in FIG. 8. In addition, since the solidified adhesive 2 is fused during the heating and pressing process, it is deformed, although its thickness is about 10μ. Thus, the edges of the recessed characters/numerals 6 are collapsed, so that it is impossible to obtain clear profiles of the recessed characters/numerals.

BRIEF SUMMARY OF THE INVENTION

It is therefore a general object of this invention to provide a hot stamping method which enables the formation of very sharp edges and profiles of characters/numerals, patterns and the like upon a surface of a base plate.

According to one aspect of this invention, a foil is transferred to the base plate by an adhesive coated on the underside of a foil sheet, while a masking layer which is not deformed by heating and pressure which requires no foil transfer. Thus, the edges and profiles of those characters/numerals, patterns and the like remain very clear upon the surface of the base plate while exposing natural surfaces of the base plate.

The hot stamping method of this invention has the following steps:

a masking step making a certain characters, numerals and patterns formed by a masking layer upon a surface of a base plate (as shown in FIG. 3A);

a step of placing a foil sheet having an adhesive layer upon a surface of the masking layer and a surface of the base plate, and transferring a foil of the foil sheet to the surface of the base plate by means of heat and pressure (as shown in FIG. 3B);

a step of leaving the transferred foil upon the surface of the base plate and releasing the maksing layer and the foil transferred to the surface thereof from the base plate (as shown in FIG. 3C).

Other objects, features and advantages of the invention will become apparent from the following description taken in connection with the accompanying drawings.

BRIEF DESCRIPTION OF THE ACCOMPANYING DRAWINGS

FIG. 1A is a section view of an example of a hot stamping method according to this invention.

FIG. 1B is a section view of the hot stamping method in FIG. 1A, in which a foil sheet is adhered to a surface of a base plate as well as to a masking layer forming certain characters, numerals, patterns, etc.

FIG. 1C is a section view of the hot stamping method in FIG. 1A, in which the masking layer is released from the base plate, while only a foil of the foil sheet 3 is adhered to a wider portion of the base plate other than the masking layer.

FIG. 2 is a section view of the foil sheet to be used for the hot stamping method, which comprises the foil sheet A and the foil B.

FIG. 5 is a plan view of an indication panel manufactured by the hot stamping method of this invention.

FIGS. 6A and 6B are section views of a conventional hot stamping method.

FIG. 6C is a section view of a foil sheet used in the aforesaid conventional hot stamping method.

FIGS. 7 and 8 are section views of a main part in FIGS. 6A and 6B, where the foil sheet is adhered to the adhesive layer under the application of heating and pressure.

DETAILED DESCRIPTION OF THE INVENTION

Figure 3A:
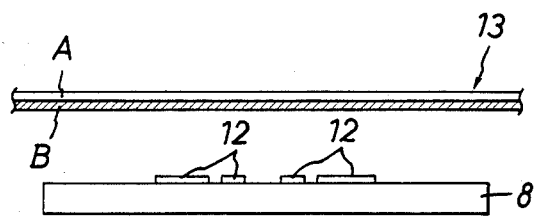
FIGS. 3A, 3B and 3C are section views for explaining the hot stamping method according to this invention.

First of all, the terminology used in this invention will be defined hereinafter.

A base plate 11 is made of paper, leather, a transparent, semitransparent or opaque plastic plate or metal plate, or the like. It may be provided with a colored surface, a foiled surface or the like.

A masking layer 12 is made of a non-adhesive material relative to the surface of the base plate 11 and is neither fused nor deformed easily under application of heat. Such material may be e.g. an oligomer of polyxylylene acrylate, ether acrylate, urethane acrylate and the like. This material is hardened easily by a preferred compounding of the aforesaid acrylates. It is hereinafter called a "resinous painting".

A foil sheet 13 is, as shown in FIG. 2, provided with an adhesive layer f in lieu of the coating layer b of the conventional foil sheet 3. When the foil sheet A is heated and pressed on the base plate 11, the foil B is adhered to the base plate 11 by the adhesive layer f. Normally, the main ingredient of the adhesive layer f is acrylic resin. The melting temperature of the acrylic resin is different in accordance with the thermal resistance temperature.

The foil body a of the foil sheet 13 may be a deposited metal foil, a color foil, a bronze, an aluminum fine powder foil or the like.

A preferred example of this invention will now be described with reference to FIGS. 1 to 3.

This example shows a case in which an indication panel 8 of FIG. 5 is treated with the hot stamping according to this invention.

The indication panel 8 is a transparent plastic plate, on which the characters/numerals 6 and the graduations 7 remain in a transparent form, while the other portion is transferred to a black metal foil B.

First of all, a masking process will be described with reference to FIG. 3A.

The characters/numerals 6 indicating frequency and frequency unit, and the graduations 7 are printed on the plastic plate 8 by a resinous coating. Thus, the masking layer 12 indicating the characters/numerals 6 and the graduations 7 is formed by coating the paint on the characters/numerals 6 and the graduations 7.

Figure 3B:
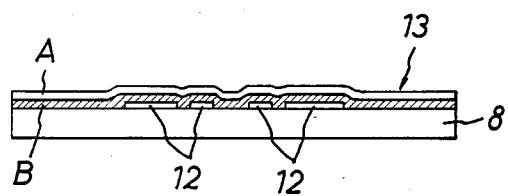

Referring to a transfer process, the foil sheet 13 is disposed on the surface of the masking layer 12. The adhesive layer f of the foil B forms an underside thereof. Subsequently, as shown in FIG. 3B, the foil B of the foil sheet 13 is heated and pressed on the masking layer 12 and on the plastic plate 8 by means of the silicone rubber which is attached to the underside of the heating plate 14. Thus, the foil B is transferred to the masking layer 12 and the plastic plate 8 as well.

A releasing process will now be described.

Figure 3C:
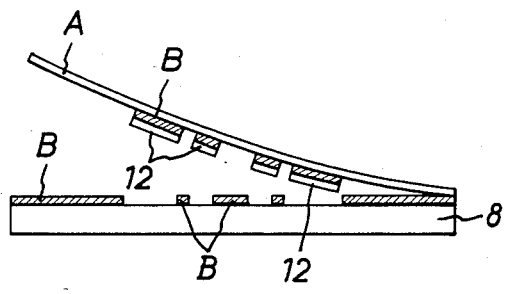

As shown in FIG. 3C, the base film A of the foil sheet 13 contacted with the plastic plate 8 and the masking layer 12 is released from the plastic plate 8 manually or by other means, and then the masking layer 12 together with the foil B is released therefrom. Accordingly, the characters/numerals 6 and the graduations 7, both of which form the masking layer 12, are transferred to the foil B, and the characters/numerals 6 and the graduations 7 expose a natural surface of the plastic plate 8.

In this way, the characters/numerals 6 and the graudations which have a small and narrow area are treated with the masking process and transferred to the foil B. On the other hand, the other larger area on the surface of the plastic plate 8 is adhered to the adhesive f portion of the foil B.

As a result, this invention has the following effects.

(1) Like a conventional technique, it is not necessary to coat the adhesive on the portion other than the masking layer 12. The adhesive is coated only on the small area of the characters/numerals 6 and the graduations 7. Accordingly, the cost of the present hot stamping process is less expensive than that of the conventional technique. This process is best when transferring the foil B on a wider area of the plastic plate 8.

Figure 4:
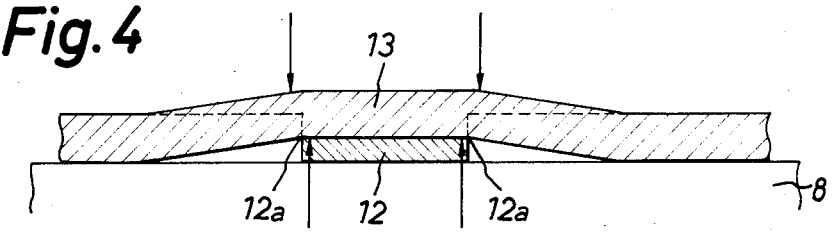
FIG. 4 is an expanded section view of a main part in FIG. 3B, where the foil sheet is adhered to the masking layer under an application of heating and pressure.

(2) The masking layer 12 is formed by the resinous coating. This coating is solidified after printing, and has a slight thickness of 10μ on the plastic plate 8 as shown in FIG. 4. Since such masking layer 12 is neither fused nor deformed by the heating and pressing application of the foil sheet 13, a shoulder 12a of the masking layer is not easily deformed.

The foil sheet 13 pressed on the plastic plate 8 is subject to shearing force of the silicone rubber 15 as shown in FIG. 1A. As a result, the foil sheet 13 is cut off sharply along the shoulder 12a as shown by a dotted line. As a result, the edges of the recessed characters/numerals 6 and the graduations 7 become acute.

As described previously, according to this invention, the foil B is transferred to the base plate 8 by the adhesive f coated on the underside of the foil sheet 13, while the masking layer which is not deformed by heating and pressure is formed on the other part of the base plate which does not require the foil transfer. Thus, the characters/numerals and patterns formed by the masking layer remain finally on the base plate as they expose a natural surface thereof. The edges and profiles of those characters/numerals and patterns are very sharp and clear, so that the indication panels manufactured by this hot stamping method can be applied for various measuring instruments for cars, aircraft and other vehicles. In addition, the present hot stamping method is very economical.

What is claimed is:

1. A hot stamping method comprising:
   a masking step in which certain characters, numerals and patterns formed by a resinous masking layer are printed upon a surface of a base plate, said masking layer being made of a material which is non-adhesive to the surface of the base plate;
   a step of placing a foil sheet, comprising a foil layer having an adhesive layer and a backing, upon a surface of the masking layer and a surface of the base plate, and transferring said foil from said backing of the foil sheet to the surface of the base plate by means of heat and pressure; and
   a step of leaving the transferred foil from the backing upon the surface of the base plate and releasing the masking layer from the surface of the base plate to the overlying foil layer of the foil sheet, leaving portions of the foil in contact with the surface of the base.

2. The hot stamping method as claimed in claim 1, wherein the non-adhesive material is an oligomer of polyxylylene acrylate, ether acrylate, urethane acrylate or the like.

* * * * *